(12) United States Patent
Manzoor

(10) Patent No.: US 10,443,700 B2
(45) Date of Patent: Oct. 15, 2019

(54) TORSIONAL VIBRATION DAMPER SPOKE DESIGN

(71) Applicant: Suhale Manzoor, Plymouth, MI (US)

(72) Inventor: Suhale Manzoor, Plymouth, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 428 days.

(21) Appl. No.: 15/084,636

(22) Filed: Mar. 30, 2016

(65) Prior Publication Data

US 2016/0290472 A1    Oct. 6, 2016

Related U.S. Application Data

(60) Provisional application No. 62/140,114, filed on Mar. 30, 2015.

(51) Int. Cl.
*F16H 55/36* (2006.01)
*F16H 55/40* (2006.01)

(52) U.S. Cl.
CPC ............. *F16H 55/40* (2013.01); *F16H 55/36* (2013.01); *F16H 2055/366* (2013.01)

(58) Field of Classification Search
CPC . F16H 55/40; F16H 2055/366; F16F 15/1202
USPC .......................................................... 474/94
See application file for complete search history.

(56) References Cited

U.S. PATENT DOCUMENTS

| 241,048 | A | * | 5/1881 | Milburn | .................. B62J 99/00 474/195 |
| 384,014 | A | | 6/1888 | Bruss | |
| 408,632 | A | * | 8/1889 | Mitchell | .................. B62J 99/00 474/195 |
| 416,943 | A | * | 12/1889 | McLean | .................. B62J 99/00 474/195 |
| 441,170 | A | * | 11/1890 | Kidder | ..................... B62J 99/00 474/195 |

(Continued)

FOREIGN PATENT DOCUMENTS

JP        11-230269        8/1999

OTHER PUBLICATIONS

GM, "I-Beam Truck Damper Assembly", Dayco IP Holdings, LLC (first commercially available at least as early as 2002).

(Continued)

*Primary Examiner* — Michael R Mansen
*Assistant Examiner* — Mark K Buse
(74) *Attorney, Agent, or Firm* — FisherBroyles, LLP; Susan M. Oiler

(57) ABSTRACT

Torsional vibration dampers (TVDs) having a plurality of spokes designed to withstand both torsional and bending forces and vibrations are disclosed. The spokes, which connect a central member to a peripheral rim, include a first end coupled to an outer radial surface of the central member; a second end coupled to an inner radial surface of the rim; and four concave surfaces extending between the first end and the second end. The concave surfaces may be concave from the first end to the second end and may also be concave laterally from front to back or side to side. A TVD having a hub with spokes having one or more concave surfaces is also disclosed herein. A method of designing the spokes for the hub is also disclosed.

10 Claims, 12 Drawing Sheets
(7 of 12 Drawing Sheet(s) Filed in Color)

(56) References Cited

U.S. PATENT DOCUMENTS

| | | | | |
|---|---|---|---|---|
| 730,591 | A * | 6/1903 | Allen | B62J 99/00 |
| | | | | 301/84 |
| 1,333,131 | A * | 3/1920 | Pieper | F16H 55/40 |
| | | | | 464/41 |
| 1,364,187 | A * | 1/1921 | Dodge | B60B 17/00 |
| | | | | 295/27 |
| 2,972,904 | A | 2/1961 | Troyer | |
| 3,371,549 | A * | 3/1968 | Schrempp | F16H 55/14 |
| | | | | 474/161 |
| 5,231,893 | A | 8/1993 | Sisco et al. | |
| 5,405,296 | A | 4/1995 | Cerny et al. | |
| 5,967,278 | A | 10/1999 | Fukushima et al. | |
| 6,089,204 | A | 7/2000 | Shaffer | |
| 6,345,430 | B1 | 2/2002 | Haga et al. | |
| 7,584,685 | B2 | 9/2009 | Crist | |
| 7,658,127 | B2 | 2/2010 | Crist | |
| 2005/0035047 | A1 * | 2/2005 | Colby | B01D 63/10 |
| | | | | 210/321.74 |
| 2005/0160572 | A1 | 7/2005 | Kano | |
| 2005/0204858 | A1 * | 9/2005 | Crist | F16F 15/126 |
| | | | | 74/574.4 |
| 2009/0111589 | A1 | 4/2009 | Bouzit et al. | |
| 2009/0145261 | A1 | 6/2009 | Obeshaw | |
| 2015/0362037 | A1 * | 12/2015 | Manzoor | F16F 15/126 |
| | | | | 188/380 |
| 2017/0314637 | A1 * | 11/2017 | Manzoor | F16H 55/40 |

OTHER PUBLICATIONS

Shear modulus; Wikipedia, the free encyclopedia; http://en.wikipedia.org/wiki/Shear_modulus; pp. 1-2 (Feb. 2007).

Young's modulus; Wikipedia, the free encyclopedia; http://en.wikipedia.org/wiki/Shear_modulus; pp. 1-5 (Feb. 2007).

Cyril M. Harris et al.; Harris' Shock and Vibration Handbook; Publisher McGraw-Hill, Chapter 35, Engineering Properties of Composites, Keith T. Kedward; pp. 35.1-35.31 (2002).

WO, Search Report and Written Opinion, International Patent Application No. PCT/US2016/024832 (dated Jun. 17, 2016).

EP, Supplemental Search Report, European Application No. 16774029.9 (dated Oct. 24, 2018).

EP, Supplemental Search Report; European Application No. 16774029.9 (dated Feb. 6, 2019).

* cited by examiner

TORSIONAL VIBRATION DAMPER SPOKE DESIGN

RELATED APPLICATION

This application claims the benefit of U.S. Provisional Application No. 62/140,114, filed Mar. 30, 2015, which is incorporated herein by reference.

TECHNICAL FIELD

The present invention relates to torsional vibration dampers for vehicle powertrains and drivetrains and, more particularly, to torsional vibration damper hubs that have spokes.

BACKGROUND

Torsional Vibration Dampers (TVDs) are useful in attenuating torsional vibrations inherent to rotating shafts, including but not limited to crankshafts, drive-shafts, prop-shafts, and half-shafts utilized in automotive and non-automotive applications. Commonly, a TVD consists of three components: (1) a rigid metallic bracket (hub) attaching the TVD to the rotating shaft with the vibratory problem; (2) an active inertia member (ring) oscillating opposite in phase to the vibrating shaft at a particular frequency, thereby reducing the resulting magnitude of the shaft vibration; and (3) an elastomeric member (strip) with two functions: (a) providing a spring damper, thereby tuning the TVD to a particular frequency; and (b) locating the hub and the ring with respect to each other in the TVD.

The hub of a TVD consists of a central bore that connects the TVD to the vibratory shaft, an outer flange that provides a mating surface for the strip, and a plurality of spokes that connect the central bore to the outer flange. The hub of the damper is a structural bracket and its associated mass and inertia have no bearing on attenuating the vibration in the system. Spoke design is therefore a balance between giving the hub adequate structural strength and NVH stability and minimizing the amount of material used, thereby reducing the parasitic inertia and mass thereof. Two traditional styles of spokes are commonly employed in hub design—tapered rectangular beam and I-beam spokes.

The hub experiences a combination of alternating loads (once every revolution) such as belt forces and belt torques; and vibratory loads (multiple times every revolution when the damper is at resonance) such as the dynamic torque. However, in recent years with the development and usage of lighter and more flexible shafts, vibratory bending loads are sometimes encountered. When such vibratory bending loads come into play, the resulting spoke designs tend to be well-designed for one type of vibratory loading (usually bending) and over-designed for the other (usually torsion). This causes the spokes and consequently the hub to be heavier than necessary.

SUMMARY

The present disclosure is directed to a TVD spoke, and a method of constructing a TVD spoke, that uses the same volume of material as traditional spokes, but promotes a significant increase in bending load bearing capacity with the same torsional load bearing capacity. This in effect yields a hub that is lighter for applications where vibratory torsional and bending loads simultaneously appear. According to one aspect of the present disclosure, a spoke connecting a central member to a peripheral rim includes a first end coupled to an outer radial surface of the central member; a second end coupled to an inner radial surface of the peripheral rim; a first concave surface extending between the first end and the second end and facing an axial direction; a second concave surface extending between the first end and the second end and facing generally opposite the first concave surface; a third concave surface extending between the first end and the second end and between the first concave surface and the second concave surface; and a fourth concave surface extending between the first end and the second end and between the first concave surface and the second concave surface, wherein the fourth concave surface faces generally opposite the third concave surface.

In another aspect of the previous embodiment, the first concave surface and the second concave surface are concave from the first end to the second end. In another aspect of the previous embodiments, the first concave surface and the second concave surface are additionally concave extending from the third concave surface to the fourth concave surface. In another aspect, the third concave surface and the fourth concave surface are concave from the first end to the second end and are generally flat from the first concave surface to the second concave surface. In another aspect, at least one concavity of at least one of the first concave surface, second concave surface, third concave surface, and fourth concave surface is defined by an arc of a circle. In another aspect, the third concave surface faces generally perpendicular to the axial direction. In another aspect, the width of the second end is smaller than the first end. In another aspect, the first end has a shape that conforms to the outer radial surface of the central member. In another aspect, the second end has a shape that conforms to the inner radial surface of the peripheral rim.

In one aspect of the present disclosure, a TVD is disclosed that includes a hub and an inertia member concentric about the hub with an elastomeric member operatively positioned therebetween. The hub includes a plurality of spokes extending from an outer radial surface of a central member to an inner radial surface of a peripheral rim. Each of the plurality of spokes includes a first end coupled to the outer radial surface of the central member; a second end coupled to the inner radial surface of the peripheral rim; a first concave surface extending between the first end and the second end and facing an axial direction; a second concave surface extending between the first end and the second end and facing opposite the first concave surface; a third concave surface extending between the first end and the second end and between the first concave surface and the second concave surface; and a fourth concave surface extending between the first end and the second end and between the first concave surface and the second concave surface, wherein the fourth concave surface faces generally opposite the third concave surface.

In another aspect of the previous embodiment of a TVD, for each of the spokes, the first concave surface and the second concave surface are concave extending from the first end to the second end. In another aspect, for each of the plurality of spokes, the first concave surface and the second concave surface are additionally concave extending from the third concave surface to the fourth concave surface. In another aspect, for each of the plurality of spokes, the third concave surface and the fourth concave surface are concave extending from the first end to the second end. In another aspect, for each of the plurality of spokes, the third concave surface and the fourth concave surface are generally flat extending from the first concave surface to the second concave surface.

In another aspect of the previous embodiments, the third concave surface faces generally perpendicular to the axial direction. In another aspect, for each of the plurality of spokes, at least one concavity of at least one of the first concave surface, second concave surface, third concave surface, and fourth concave surface is defined by an arc of a circle.

In another aspect, a front end accessory drive system includes the TVD of the previous embodiments, the TVD being mounted to a crankshaft for rotation therewith.

According to another aspect, a method for designing a spoke for a TVD is disclosed having the steps of drawing a central member offset outer diameter inward from an outer diameter of a central member by a selected first offset; drawing a peripheral rim offset inner diameter outward from a peripheral rim inner diameter; drawing a first line radially outward from a center of the outer diameter of the central member to at least the peripheral rim offset inner diameter at a position representing a midsagittal plane of a first spoke; drawing a second line radially outward from the center of the outer diameter of the central member to at least the peripheral rim offset diameter at a position representing a midsagittal plane of a neighboring second spoke; drawing a third line parallel to the first line and laterally offset therefrom by a selected second offset; drawing a fourth line parallel to the second line and laterally offset therefrom, but toward the third line, by the second offset; drawing a first arc tangent to the third line, the fourth line, and the central member offset outer diameter; drawing a second arc as a mirror image of the first arc relative to the first line, thereby defining opposing sides of a starting spoke geometry; removing lines and diameter circles except those defining the starting spoke geometry; reproducing the starting spoke geometry a plurality of times and disposing at least two thereof above and at least two thereof below a centrally positioned spoke geometry thereof, wherein the outermost spoke geometry above and below the centrally positioned spoke geometry is closer to its neighboring spoke geometry than its neighbor is to the central starting spoke geometry; drawing eight arcs using each set of adjacent corners of each of the outermost spoke geometries, wherein the arcs extend between the adjacent corners and pass through a midpoint between the same adjacent corners of its neighboring spoke geometry; drawing four line segments, parallel to the axis, from each of the corners of one of the outermost spoke geometries to the same corner of the other outermost spoke geometry; and retaining only the eight arcs and four line segments thereby defining the three dimensional shape of the first spoke.

In another aspect, a method of designing a TVD is disclosed that includes all of the steps in the previous embodiment for designing spokes for a TVD in addition to the following: forming the surfaces of the three dimensional shape of the first spoke; reproducing the three dimensional shape of the first spoke to define a plurality thereof equivalent to a preselected number of spokes; arranging the plurality of spokes about a central axis of the TVD as a polar array with each of the first ends toward the central axis; drawing the central member against the first end of each of the plurality of spokes; and drawing the peripheral rim against the second end of each of the plurality of spokes.

In another aspect of the previous embodiment, drawing the central member includes unhiding the central member, and drawing the peripheral rim includes unhiding the peripheral rim. In another aspect of the previous embodiments, the method further includes extruding the washer face of the central member. In another aspect, the method includes drawing/creating a circle on one axial face of the hub to define a seal nose. In another aspect of the previous embodiments, the method includes elongating, axially, the seal nose and adding chamfers and fillets.

BRIEF DESCRIPTION OF DRAWINGS

The patent or application file contains at least one figure executed in color. Copies of this patent or patent application publication with color figure(s) will be provided by the Office upon request and payment of the necessary fee.

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION

Figure 1:
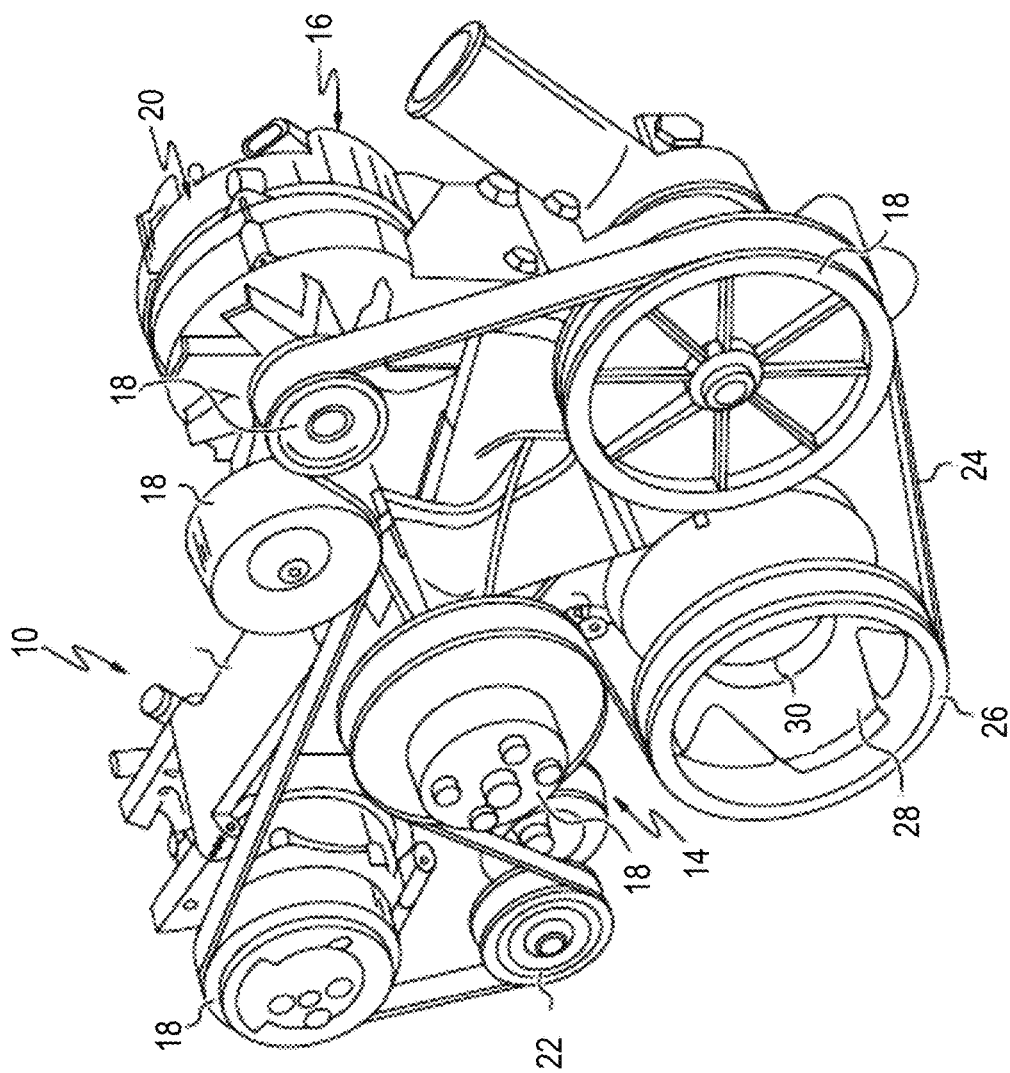
FIG. 1 is a perspective view of components in a front end accessory drive system.

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Referring now to FIG. 1, an example embodiment of a Front End Accessory Drive (FEAD) system 10 is shown, merely for illustrative purposes. The FEAD 10 is preferably mounted to an engine and may include a number of engine drive accessories 18, such as a vacuum pump, fuel injection pump, oil pump, water pump, power steering pump, air conditioning pump, alternator, belt-tensioner, or a cam drive, for example. The drive accessories 18 are driven by at least one endless drive belt 24, which is also engaged with a TVD 26 mounted to a nose 28 of the crankshaft 30. The crankshaft 30 drives the TVD 26 and thereby drives the endless drive belt 24, which in turn drives the remaining engine drive accessories 18 and the alternator 20.

Figure 2:
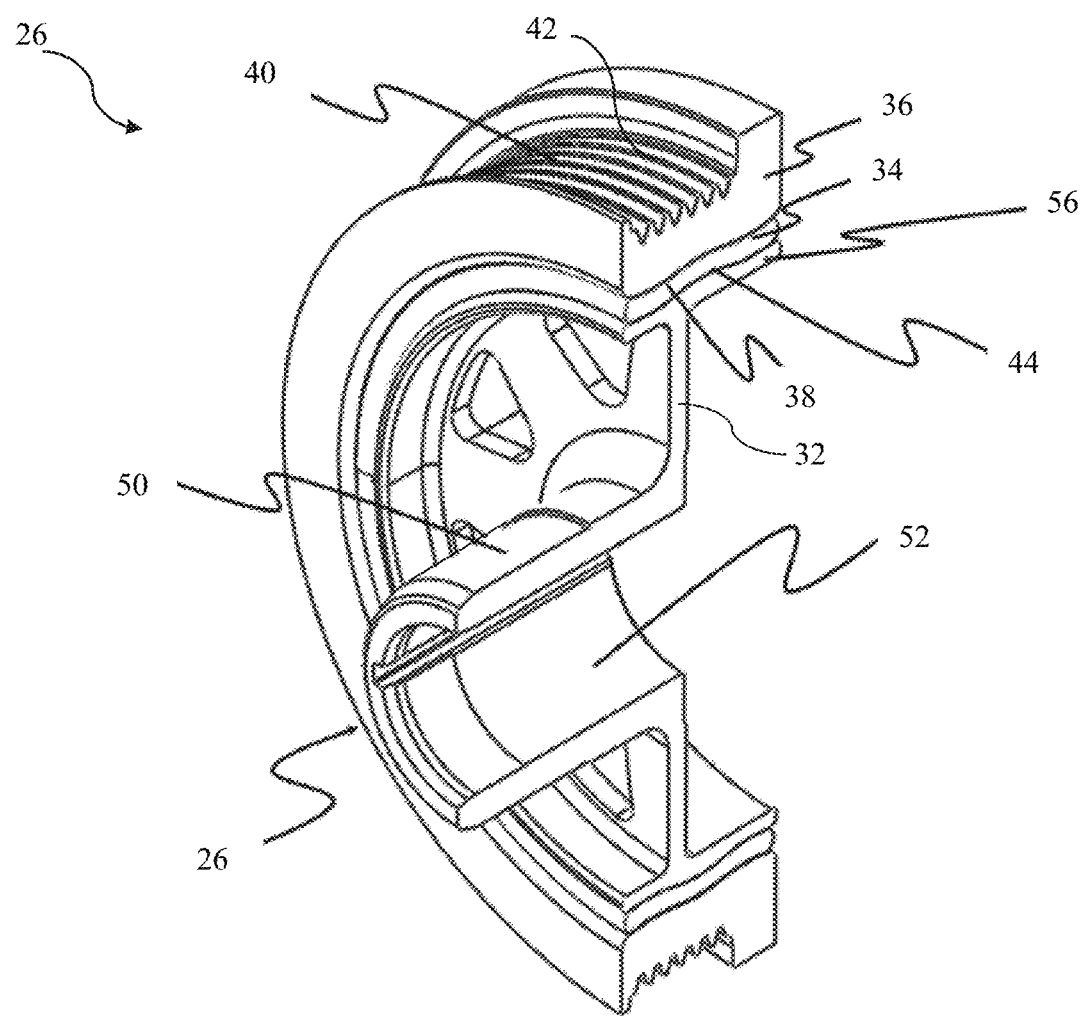
FIG. 2 is an axial cross-section, perspective view of a typical TVD used in the front end accessory drive system of FIG. 1.

Referring now to FIG. 2, an example of one embodiment of a TVD 26 is shown for illustrative purposes. The TVD 26 includes a hub 32 operatively coupled to an inertia member 36 by a damper elastomeric member 34 to dampen and/or absorb the vibrational frequencies of the rotating hub 32 and of a crankshaft. The damper elastomeric member 34 and the inertia member 36 may be referred to herein collectively as a damper assembly 44. The TVD 26 may also include an isolator (not shown) to prevent transfer of rigid body mode vibrations of the crankshaft to the FEAD system.

The inertia member 36 is generally radially concentric about the hub 32 and spaced outward from the hub 32 such that the inertia member 36 and the hub 32 define a gap therebetween. The inertia member 36 (which may also be described herein as a pulley body) has an inner radial surface 38 for engagement with the damper elastomeric member 34 and a belt-engaging portion 40 for engagement with an endless drive belt such as the belt 24 in the FEAD system 10 of FIG. 1. The damper elastomeric member 34 may be press fit or injected into the gap defined between the inertia member 36 and the hub 32 so as to non-rigidly couple the hub 32 and the inertia member 36. The damper elastomeric member 34 may be as disclosed in U.S. Pat. No. 7,658,127, which is incorporated herein, in its entirety, by reference.

Figure 3:
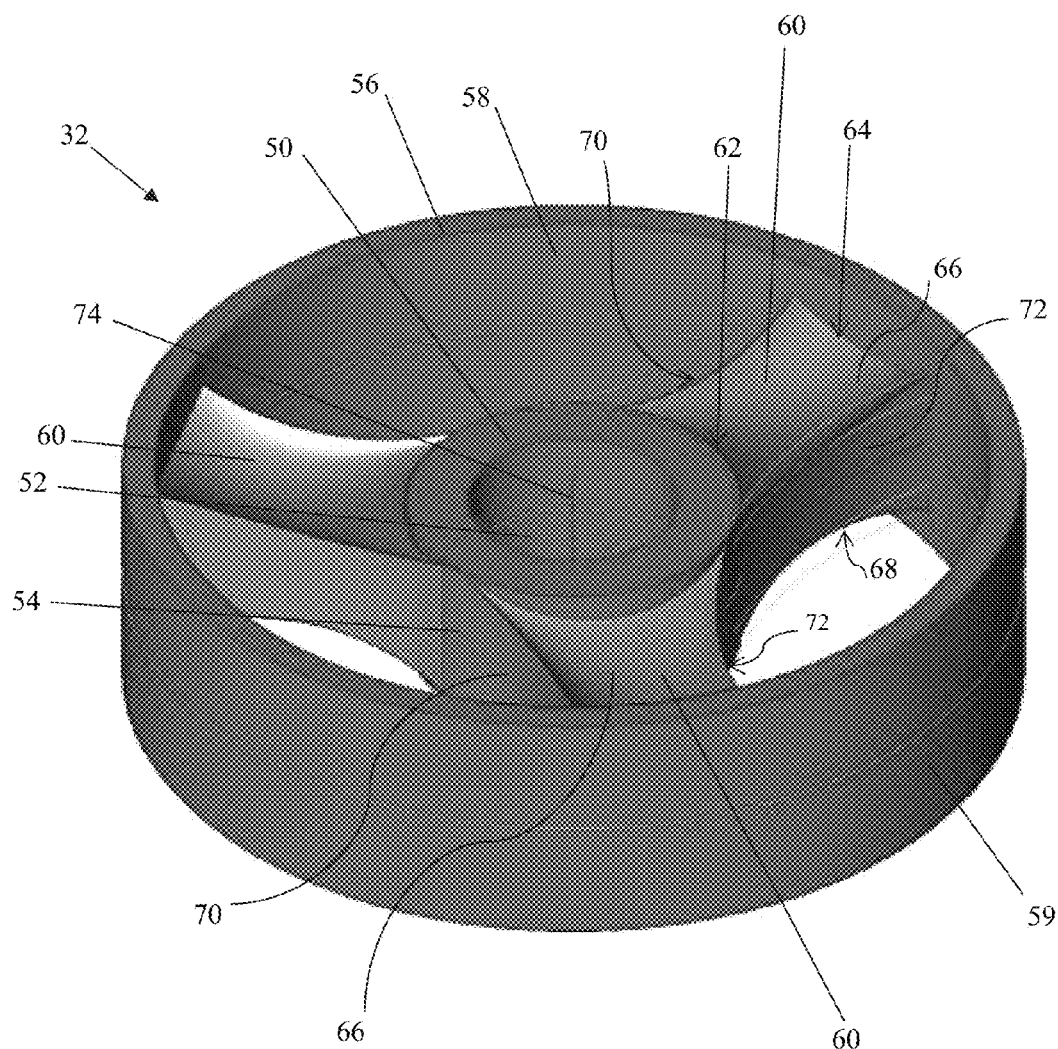
FIG. 3 is a front perspective view of the hub of the TVD of FIG. 2.

FIG. 3 discloses a hub 32 having spokes designed to withstand both torsional and bending loads. The hub 32 has a central member 50 having a central bore 52 and an outer radial surface 54; a peripheral rim 56 generally radially concentric about the central member 50 and spaced radially outward from the central member 50, and having an inner radial surface 58 and an outer radial surface 59; and a plurality of spokes 60 extending from the outer radial surface 54 of the central member 50 to the inner radial surface 58 of the peripheral rim 56. The hub 32 is mountable to a crankshaft by receiving the crankshaft through its central bore 52. The peripheral rim 56 may be referred to herein as a rim 56. The rim 56 has an outer radial surface 59 for engagement with the damper assembly. The hub 32 may be cast, spun, forged, machined, or molded using known or hereinafter developed techniques. In some embodiments, the hub 32 may be one or more portions that are welded, brazed, or otherwise attached to form a single piece. Suitable materials for the hub 32 include, but are not limited to, iron, steel, aluminum, other suitable metals, plastics, or a combination thereof, including composite materials.

Figure 4:
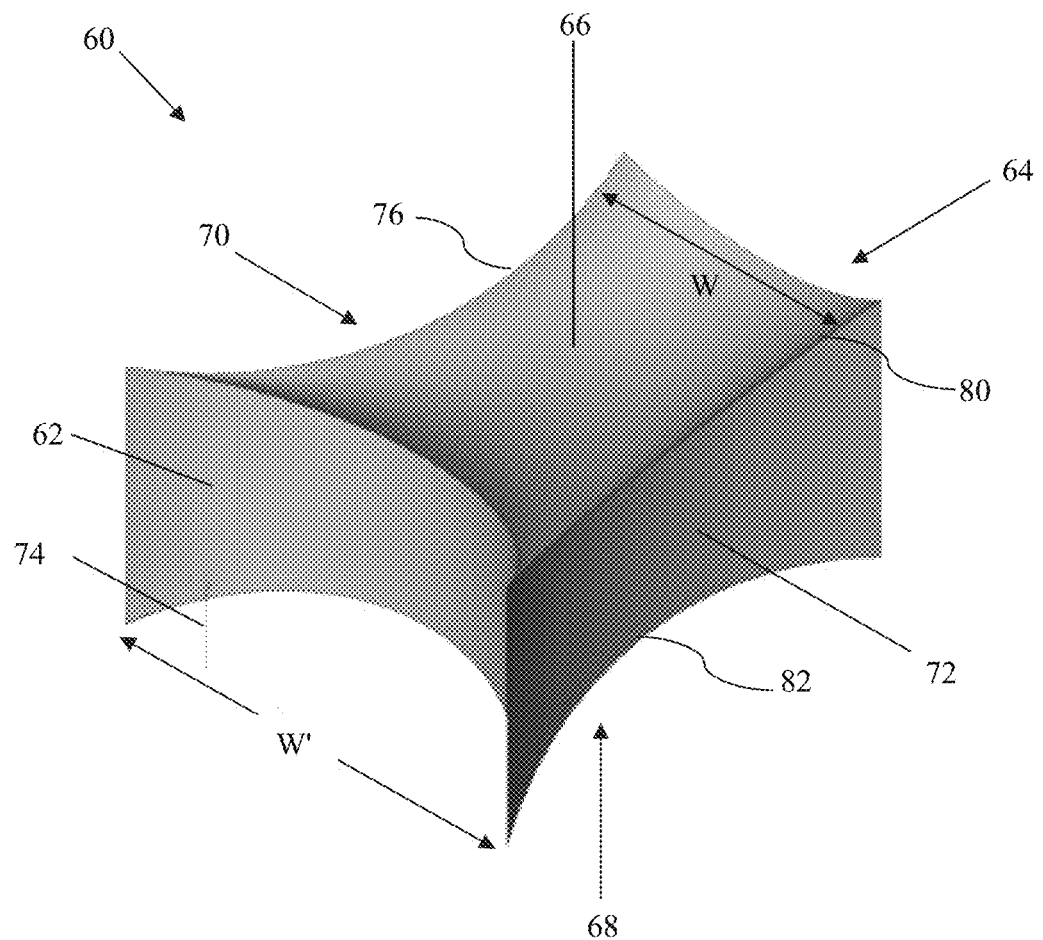
FIG. 4 is a front perspective view of an embodiment of a spoke of the hub in FIG. 3.
Figure 5:
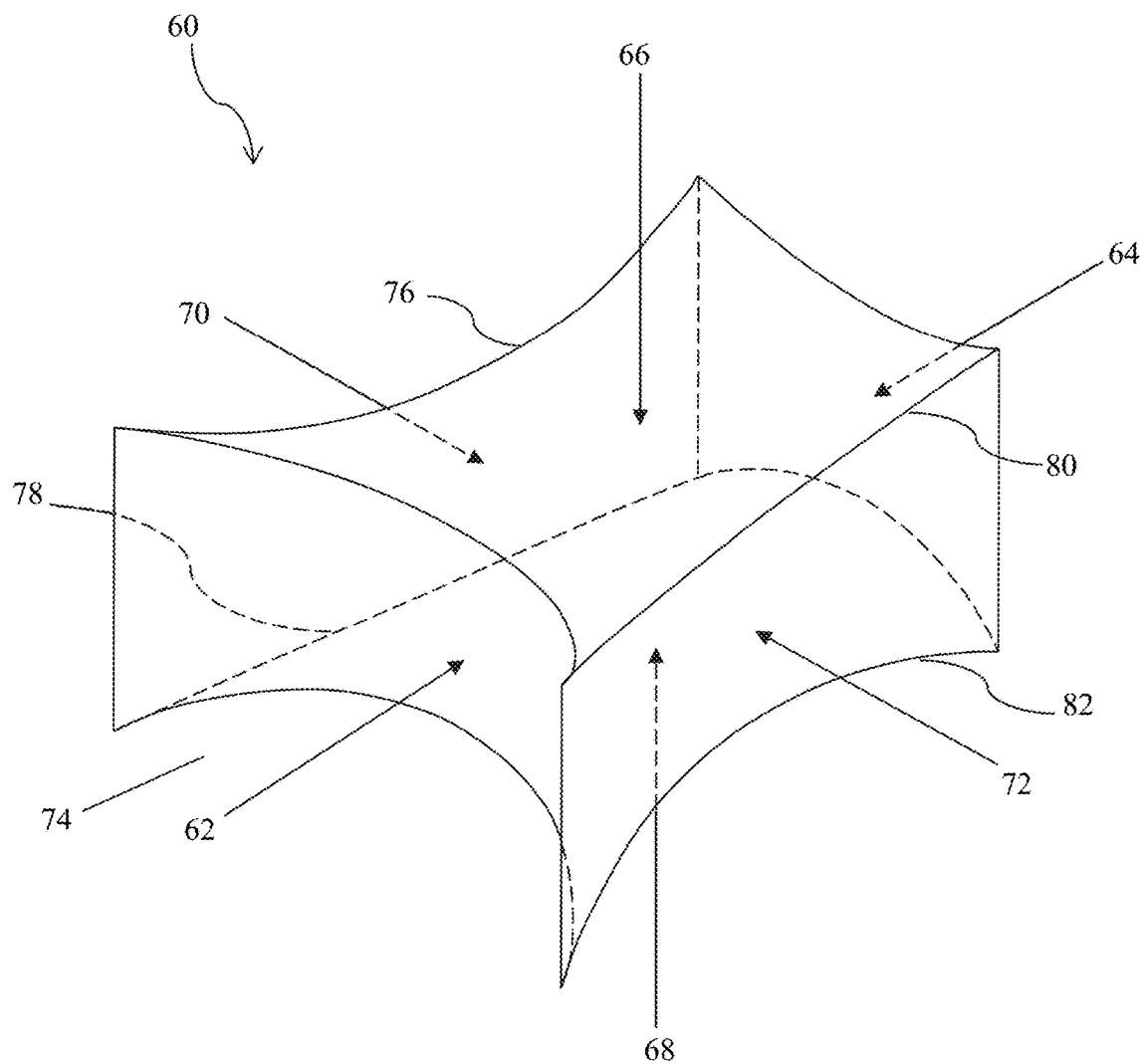
FIG. 5 is a perspective line drawing of the spoke of FIG. 4.

Referring now to FIGS. 3-5, the plurality of spokes 60 may include three spokes 60 as shown in FIG. 3, but is not limited thereto. In other embodiments, the hub 32 may have more than three spokes 60 extending from the central member 50 to the rim 56. Each of the plurality of spokes 60 has a first end 62 coupled to the outer radial surface 54 of the central member 50 and a second end 64 coupled to the inner radial surface 58 of the rim 56. In one embodiment, a width W of the second end 64 may be smaller than a width W' of the first end 62. The outer radial surface 54 of the central member 50 has a contour, and the first end 62 of the spoke 60 may have a shape that conforms to the contour of the outer radial surface 54 of the central member 50. In one embodiment, the contour of the outer radial surface 54 of the central member 50 may be cylindrical, and the first end 62 of the spoke 60 may be generally arcuate such that the first end 62 of the spoke 60 fits against and conforms to the outer radial surface 54 of the central member 50. The second end 64 of each spoke 60 may have a shape that conforms to a contour of the inner radial surface 58 of the rim 56. In one embodiment, the contour of the inner radial surface 58 of the rim 56 is cylindrical, and the second end 64 of the spoke 60 is generally arcuate to conform to the cylindrical inner radial surface 58 of the rim 56. It is understood that the outer radial surface 54 of the central member 50 and the inner radial surface 58 of the rim 56 may have other shapes to which the first end 62 and the second end 64 of the spoke 60, respectively, conform.

Each of the plurality of spokes 60 is solid from the first end 62 to the second end 64 and, with reference to FIGS. 3-5, is further defined by a first concave surface 66, a second concave surface 68, a third concave surface 70, and a fourth concave surface 72, all of which extend from the first end 62 to the second end 64 of the spoke 60. The first concave surface 66 and the second concave surface 68 are generally opposing faces of the spoke 60 and face generally in opposing axial directions. The third concave surface 70 and the fourth concave surface 72 are opposing faces of the spoke 60 and are positioned generally perpendicular to the first concave surface 66 and second concave surface 68. In one embodiment, the third concave surface 70 may extend from a first edge 76 of the first concave surface 66 to a first edge 78 (see FIG. 5) of the second concave surface 68. The fourth concave surface 72 extends from the first end 62 to the second end 64 of the spoke 60 and also extends from the first concave surface 66 to the second concave surface 68 along the length of the spoke 60. In one embodiment, the fourth concave surface 72 may extend from a second edge 80 of the first concave surface 66 to a second edge 82 of the second concave surface 68. The third concave surface 70 faces in a direction that may be generally perpendicular to the axial direction, and the fourth concave surface 72 faces in a direction that may be generally opposite to the direction in which the third concave surface 70 faces.

Still referring to FIGS. 3-5, the first concave surface 66 may be concave from the first end 62 to the second end 64 of the spoke 60. The first concave surface 66 may be concave from the first edge 76 to the second edge 80 of the first concave surface 66, which may also be described as the first concave surface 66 being concave from the third concave surface 70 to the fourth concave surface 72. In one embodiment, the first concave surface 66 may be concave from the first end 62 to the second end 64 and from the first edge 76 to the second edge 80 of the first concave surface 66. The second concave surface 68 may be concave from the first end 62 to the second end 64 of the spoke 60. The second concave surface 68 may be concave from the first edge 78 to the second edge 82 of the second concave surface 68, which may also be described as the second concave surface 68 being concave from the third concave surface 70 to the fourth concave surface 70. In one embodiment, the second concave surface 68 may be concave from the first end 62 to the second end 64 and from the first edge 78 to the second edge 82 of the second concave surface 68. In one embodiment, the first concave surface 66 may have a concavity or contour that is the same as a concavity or contour of the second concave surface 68.

The third concave surface 70 is concave from the first end 62 to the second end 64 of the spoke 60. The third concave surface 70 may be concave from the first concave surface 66 to the second concave surface 68. In one embodiment, the third concave surface 70 may be concave from the first end 62 to the second end 64, but may be generally flat or straight extending from the first concave surface 66 to the second concave surface 68 (i.e. not concave laterally, only from the first end to the second end). In another embodiment, the third concave surface 70 may be concave both from the first end 62 to the second end 64 and from the first concave surface 66 to the second concave surface 68. The fourth concave surface 72 is concave from the first end 62 to the second end 64 of the spoke 60. The fourth concave surface 72 may also be concave from the first concave surface 66 to the second concave surface 68. In one embodiment, the fourth concave surface 72 may be generally flat/straight extending from the first concave surface 66 to the second concave surface 68 (i.e. not laterally concave). In another embodiment, the fourth concave surface 72 may be concave from the first end 62 to the second end 64 and from the first concave surface 66 to the second concave surface 68. In one embodiment, the third concave surface 70 may have a concavity or contour that is the same as a concavity or contour of the fourth concave surface 72.

Concave/concavity, as used above, refers generally to a contour of a surface that bends or curves inward toward the center of a shape; in this case, the shape is the spoke 60. The concavities of the surfaces described above (first concave surface 66, second concave surface 68, third concave surface 70, and fourth concave surface 72) may be generally circular (arcuate), elliptical, parabolic, hyperbolic, or other curved shape. The concavity may occur with respect to one or more directions. In one embodiment, at least one of the first concave surface 66, second concave surface 68, third concave surface 70, and fourth concave surface 72 has a concavity that is defined by an arc of a circle. In one embodiment, at least one of the first concave surface 66, second concave surface 68, third concave surface 70, and fourth concave surface 72 may have arcuate concavity both laterally across the surface and radially from the first end 62 to the second end 64 such that the surface conforms to the surface contour of a sphere.

Figure 6:
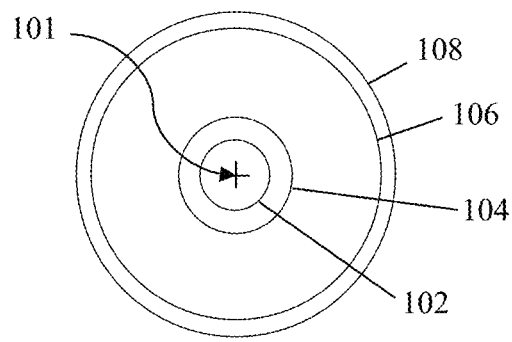
FIGS. 6-15 are line drawings illustrating the steps of a method for designing the spoke of FIGS. 3-4.

Referring to FIGS. 6-21, a method of designing a spoke of the present disclosure will be described. The method may be performed by hand using traditional drafting techniques or through the use of a computer-aided drafting software. In both cases, the method may include the use of multiple drawing layers. As shown in FIG. 6, four diameters are first drawn about a center axis 101 of the TVD (the center axis 101 extends perpendicular to the sheet upon which FIG. 6 is printed and is therefore represented as a point or center point about which the four diameters are generally concentric). The four diameters represent the following specific physical aspects of the hub: the central bore 102, the outer radial surface of the central member 104, the inner radial surface of the rim 106, and the outer radial surface of the rim 108. The diameter drawn to represent the outer radial surface of the central member may be referred to as the central member outer diameter 104, and the inner radial surface of the rim 106 may be referred to herein as the rim inner diameter 106.

Figure 7:
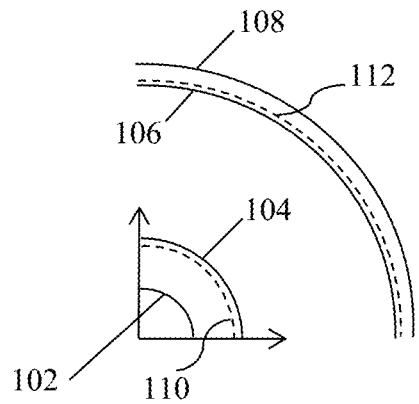
Figure 8:
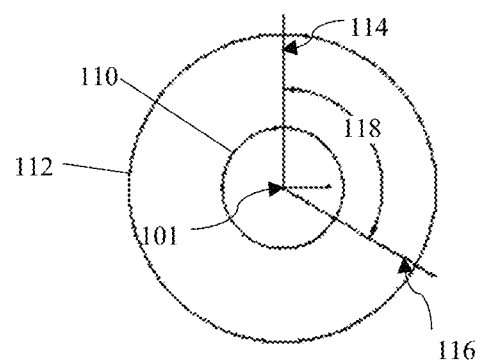

Referring now to FIG. 7, a central member offset outer diameter 110 is drawn inward from the central member outer diameter 104, the central member offset outer diameter 110 being smaller than the central member outer diameter 104 by a central member offset 111, which is a radial distance from the central member offset outer diameter 110 to the central member outer diameter 104. A rim offset inner diameter 112 is drawn outward from the rim inner diameter 106 such that the rim offset inner diameter 112 is larger than the rim inner diameter 106 by a rim offset 113, which is a radial distance from the rim offset inner diameter 112 to the rim inner diameter 106. The rim offset inner diameter 112 and the central member offset outer diameter 110 may be generally concentric about the center axis 101 (center point). The central member offset 111 and the rim offset 113 may be generally the same and equal to a first offset. In one embodiment, the four original diameters—central bore 102, central member outer diameter 104, rim inner diameter 106, and rim outer diameter 108—may be converted to construction lines and moved to another layer of a drawing for use in later steps, leaving only the central member offset outer diameter 110 and the rim offset inner diameter 112, as shown in FIG. 8. In one embodiment, the four original diameters 102, 104, 106, and 108 may be hidden, erased, deleted or otherwise removed from the drawing, to be added back in later after the spoke is designed.

Figure 9:
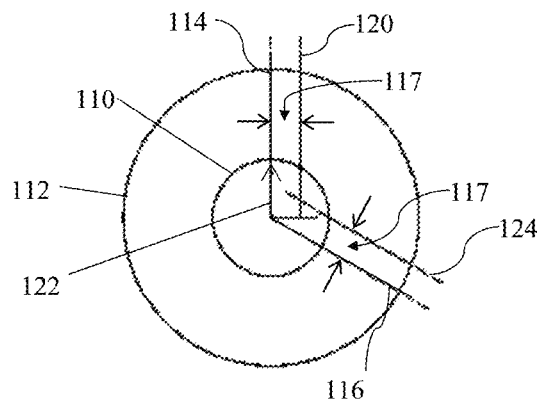

Referring now to FIG. 8, a first line 114 is drawn radially outward and straight from the center axis 101 to at least the rim offset inner diameter 112. A position of the first line 114 represents a midsagittal plane of a first spoke to be created subsequently as shown in FIGS. 9-20. A second line 116 is drawn radially outward and straight from the center axis 101 to at least the rim offset inner diameter 112 at a position intended to represent a midsagittal plane of a second spoke. In one embodiment, an angle 118 between the first line 114 and the second line 116 can be determined by dividing 360° (2π radians) by a desired number of spokes. For the embodiment depicted in FIG. 3, the hub has three spokes; thus, angle 118 is about 120° (2.1 radians). Referring to FIG. 9, a third line 120 is drawn that is parallel to the first line 114 and laterally offset from the first line 114 by a second offset 117. If a y-axis 122 is aligned with the first line 114, then the lateral offset of the third line 120 from the first line 114 is in a positive x-axis direction (or looking at the top view of FIG. 9, the third line 120 is to the right of the first line 114). A fourth line 124 is drawn that is parallel to the second line 116 and laterally offset from the second line 116 by a distance equal to the second offset 117. The fourth line 124 is laterally offset from the second line 116 towards the third line 120 such that the third line 120 and the fourth line 124 intersect.

Figure 10:
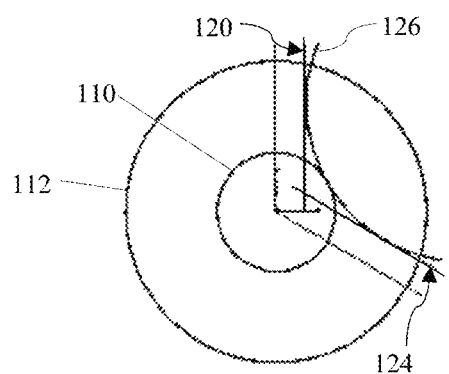
Figure 11:
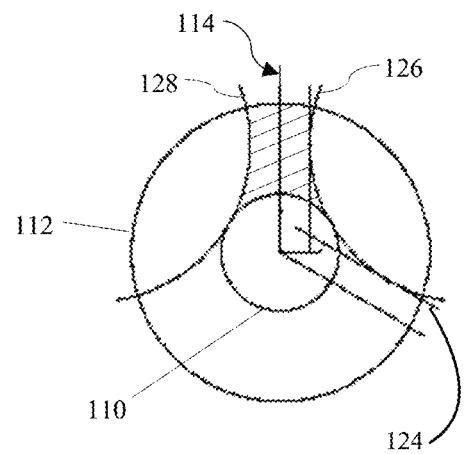

Referring now to FIG. 10, a first arc 126 is drawn tangent to the third line 120, the fourth line 124, and the central member offset outer diameter 110. Referring to FIG. 11, a second arc 128 is drawn that is a mirror image of the first arc 126 about or relative to the first line 114. A starting spoke geometry is thus defined by the first arc 126, the second arc 128, the central member offset outer diameter 110, and the rim offset inner diameter 112 and has been shaded with a fill pattern merely for ease of understanding the drawing. More specifically, the starting spoke geometry is defined by the following: a segment of the first arc 126 extending from the rim offset inner diameter 112 to the central member offset outer diameter 110; a segment of the central member offset outer diameter 110 extending from the first arc 126 to the second arc 128; a segment of the second arc 128 extending from the central member offset outer diameter 110 to the rim offset inner diameter 112; and a segment of the rim offset inner diameter 112 extending from the second arc 128 to the first arc 126.

Figure 12:
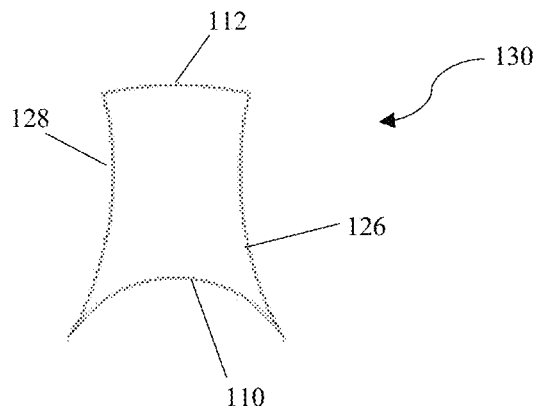

Next, as shown in FIG. 12, portions of all lines and circle diameters that do not define a boundary of the starting spoke geometry 130 are hidden, erased, deleted, or otherwise removed.

Figure 13:
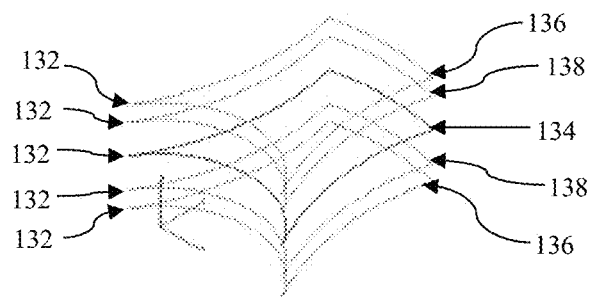

Then, the starting spoke geometry 130 is reproduced a plurality of times as shown in FIG. 13. One of the reproduced spoke geometries 132 is centrally positioned to be a centrally positioned spoke geometry 134. At least two of the reproduced spoke geometries 132 are positioned above the centrally positioned spoke geometry 134, and at least two of the reproduced spoke geometries 132 are positioned below the centrally positioned spoke geometry 134. The outermost reproduced spoke geometry 136 above the centrally positioned spoke geometry 134 is closer to a neighboring spoke geometry 138 than the neighboring spoke geometry 138 is to the centrally positioned spoke geometry 134. Likewise, the outermost reproduced spoke geometry 136 below the centrally positioned spoke geometry 134 is closer to a neighboring spoke geometry 138 than the neighboring spoke geometry 138 is to the centrally positioned spoke geometry 134.

Figure 14:
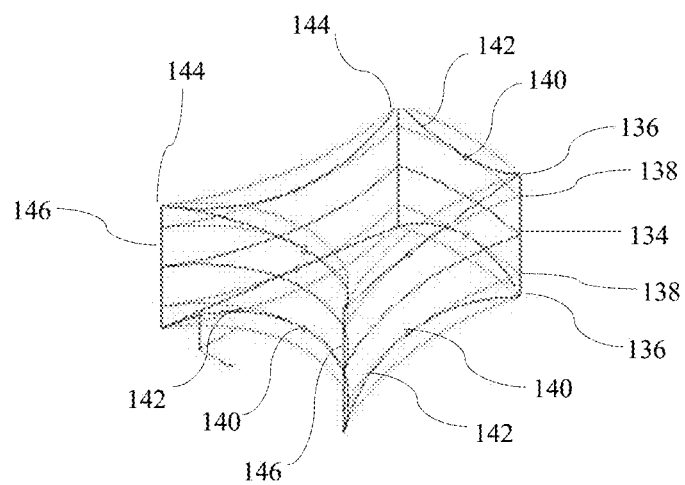
Figure 15:
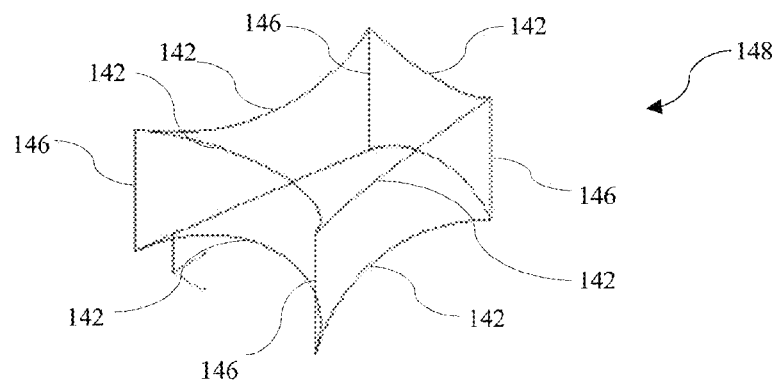

Referring now to FIG. 14, the midpoints 140 of each boundary arcuate line of the neighboring spoke geometries 138, both above and below the centrally positioned spoke geometry 134, are determined and marked. Eight arcs 142 are then drawn with one each being between each set of adjacent corners 144 of each of the outermost spoke geometries 136. Each arc 142 passes from one adjacent corner 144, through the midpoint 140 of the boundary line of the neighboring spoke geometry 138 to the other adjacent corner 144. Four vertical lines 146 are then drawn to connect the corners of one of the outermost spoke geometries 136 to the same corner of the other outermost spoke geometry 136. The vertical lines 146 are line segments that are parallel to the vertical axis. Referring now to FIG. 15, the eight arcs 142 and four vertical line segments 146 are retained to define the three dimensional shape 148 of the first spoke. All other lines/geometries may be hidden, erased, deleted, or otherwise removed from the drawing.

Figure 16:
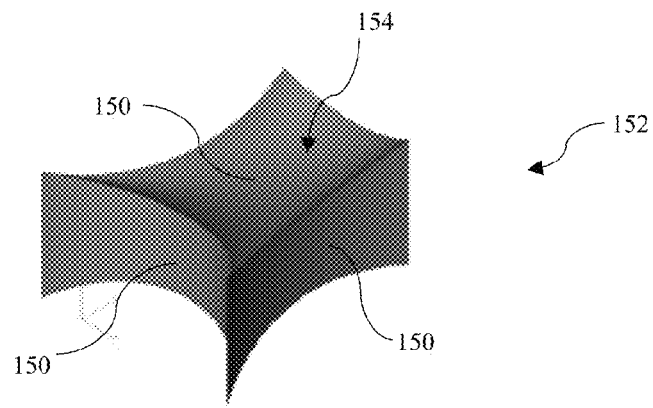
FIGS. 16-20 are perspective drawings illustrating additional steps of the method for designing the spoke of FIGS. 3-4.
Figure 17:
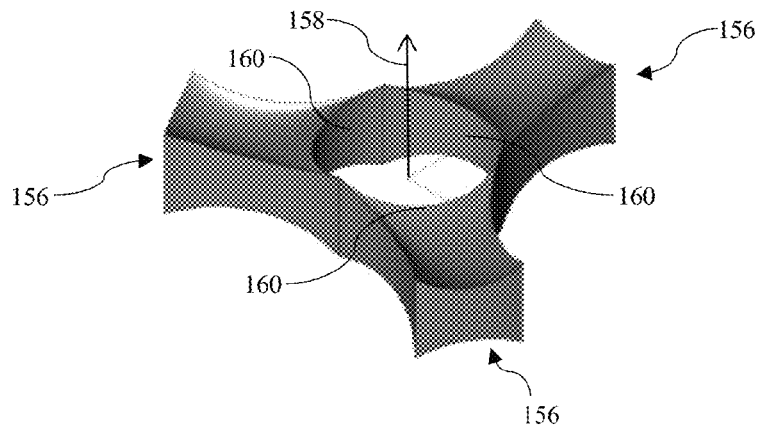

Referring to FIG. 16, the method of designing a spoke may further include forming surfaces 150 of the three dimensional shape of the first spoke 152. The surfaces 150 may form a solid body 154. As shown in FIG. 17, the three dimensional shape of the first spoke 152 may be reproduced to define a plurality of spokes 156 having three dimensional shapes identical to the first spoke 152. The number of spokes 156 may be a preselected number, e.g., as shown in FIG. 17, three spokes, but four, five, or more spokes are possible. As shown in FIG. 17, the plurality of spokes 156 may be arranged about an axis 158 as a polar array with each of the first ends 160 oriented towards the axis 158.

Figure 18:
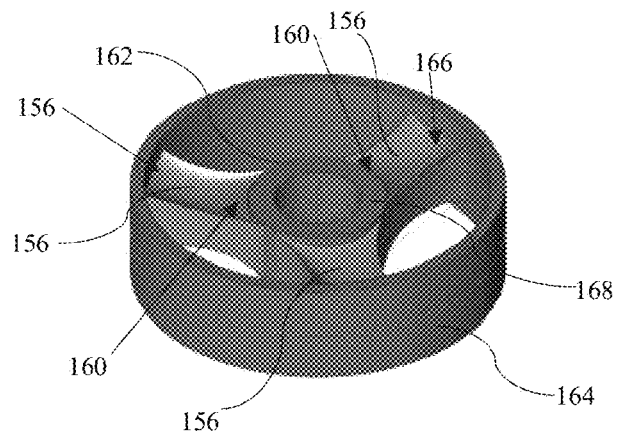
Figure 19:
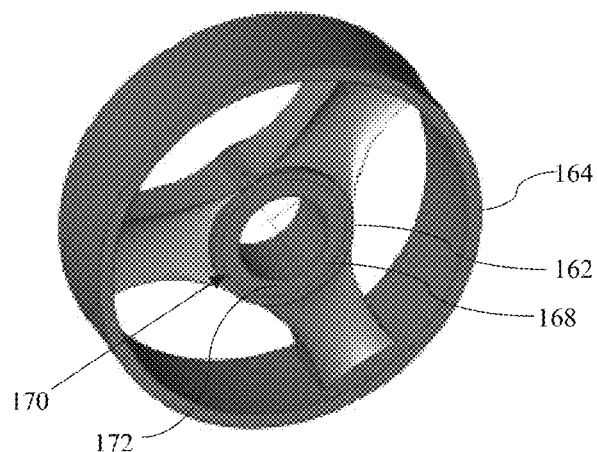
Figure 20:
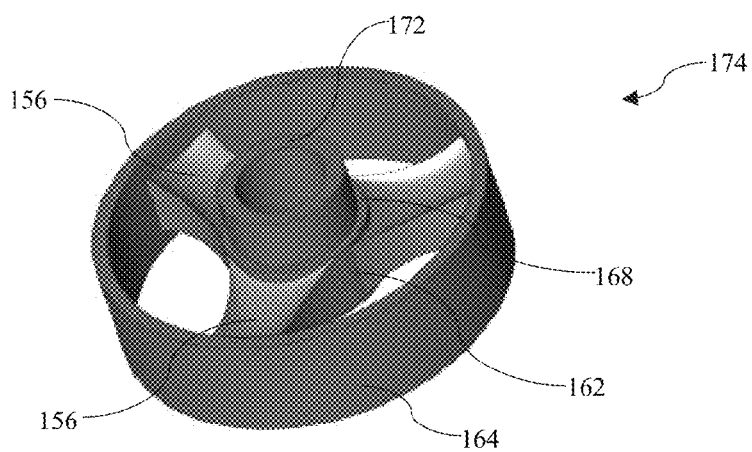

Referring now to FIG. 18, the method further includes drawing the central member 162 against the first end 160 of each of the plurality of spokes 156 and drawing a peripheral rim 164 (rim) against the opposite second end 166 of each of the plurality of spokes 156. In one embodiment, the central member 162 was designed prior to designing the spokes 156 so that drawing the central member 162 involves unhiding or overlaying the central member 162 back into the design. Likewise, drawing the peripheral rim 164 may involve unhiding or overlaying the rim 164 back into the design. The face 168 (washer face) of the central member 162 may be extruded. Referring now to FIG. 19, a circle 170 may be drawn on one axial face 168 of the central member 162 to define a seal nose 172. As shown in FIG. 20, the seal nose 172 may be elongated axially from the axial face 168 of the central member 162. All the solids may then be unioned to form the final hub design 174. Chamfers and fillets (not shown) may be added to the final hub design 174.

Figure 21:
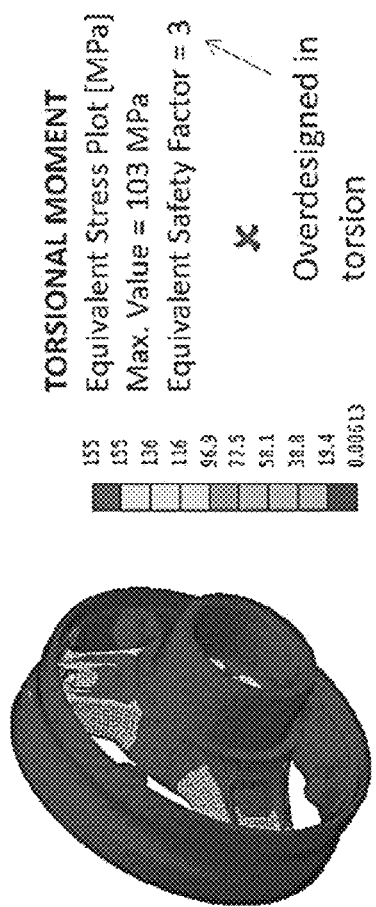
FIG. 21 is 3D plot of a finite element model of a prior art hub, having spokes of a traditional I-beam design, responding to a fixed torsional moment.
Figure 21:
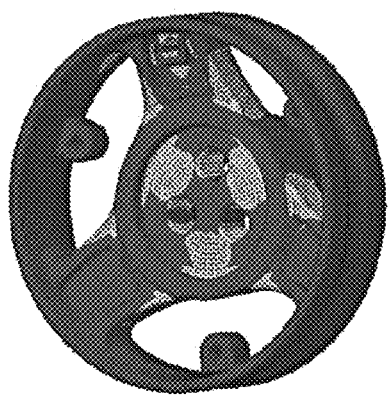
Figure 22:
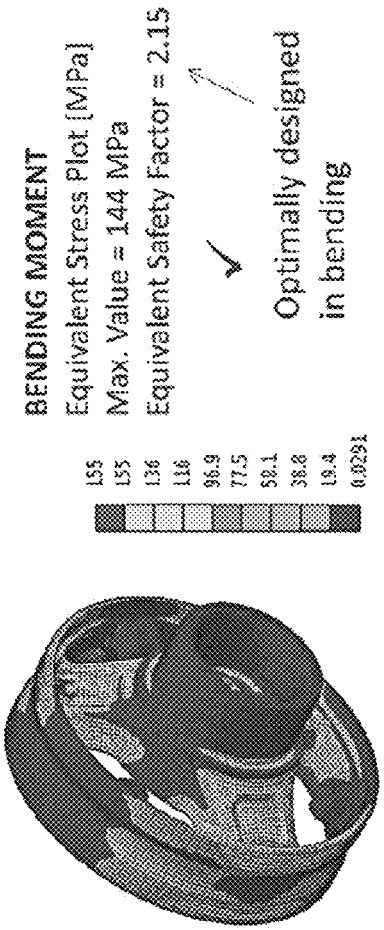
FIG. 22 is a 3D plot of a finite element model of the hub of FIG. 21 responding to a fixed bending moment.
Figure 22:
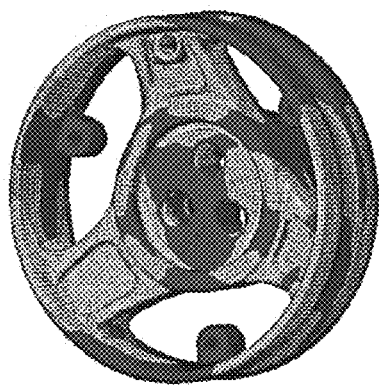
Figure 23:
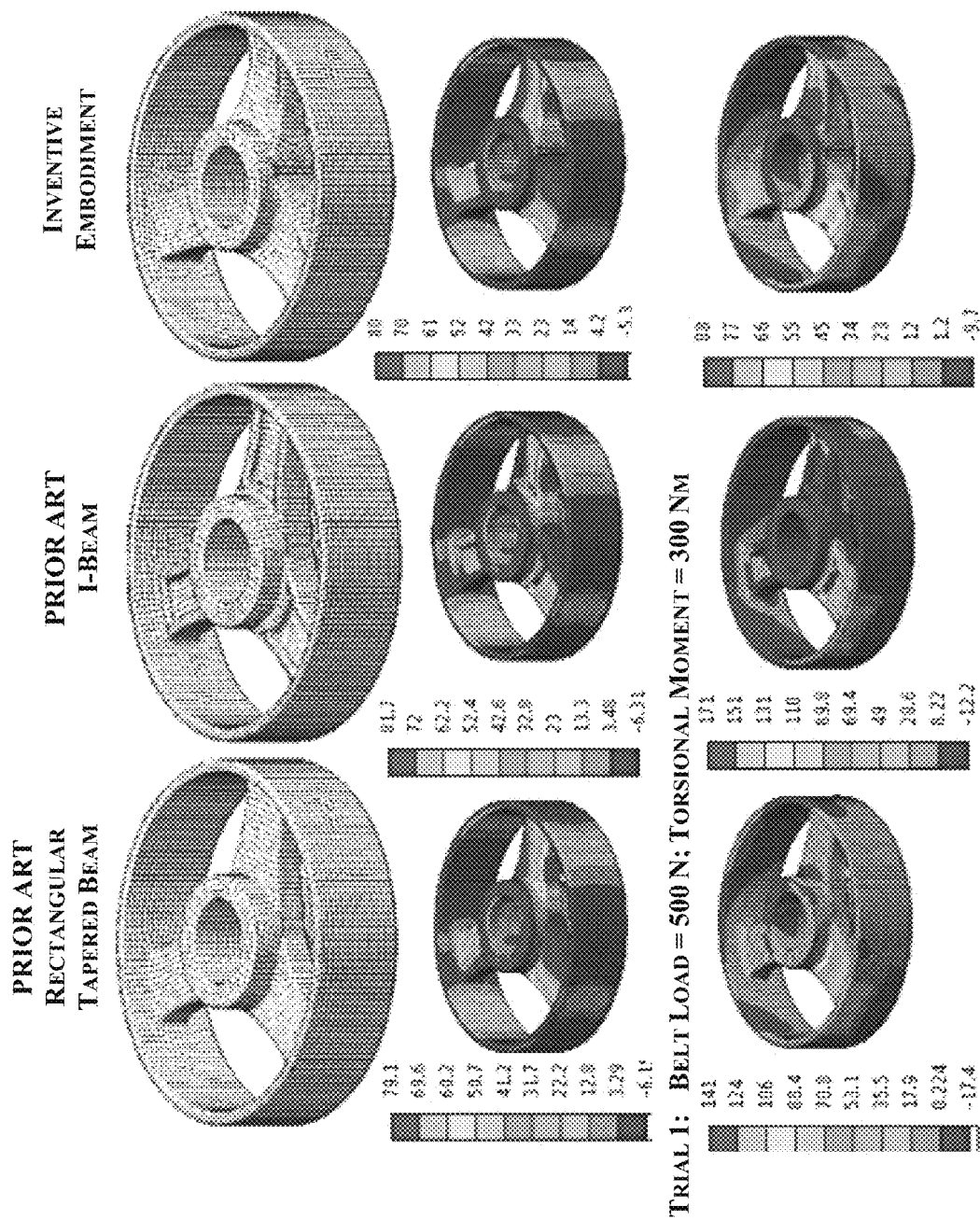
FIG. 23 is a comparison of 3D plots of finite element models of two prior art hubs against an inventive embodiment as disclosed herein for both a fixed bending moment and a fixed torsional moment.

The spokes disclosed herein are designed to withstand both torsional and bending forces acting on the hub, which may result in a reduction in weight, inertia, and ultimately the cost of the damper system in which the hub is incorporated. To illustrate this point, FIGS. 21-23 are included. FIGS. 21-22 show the results of 3D finite element models of a hub having a typical I-beam configuration common in the art. FIG. 21 shows the performance of the hub in response to a torsional moment of fixed magnitude and indicates an equivalent safety factor of 3 for withstanding torsional forces. FIG. 22 shows the results for the same hub exposed to a bending moment of the same fixed magnitude. The equivalent safety factor for the hub in response to the bending moment was 2.15.

Referring now to FIG. 23, the performance of a hub having the spokes disclosed herein was compared against the performance of hubs having traditional spoke designs: one having rectangular tapered beam spokes and the other having I-beam spokes. FIG. 23 shows the results of 3D finite element models for these hubs of equal weight and similar features (i.e. chamfers and fillets), the only difference being the geometry of the spokes. For trial one, the performance of each of the hubs was modeled in response to a torsional moment of 300 Nm at a belt load of 500 N. For trial two, the performance of each of the hubs was modeled in response to a bending moment of 100 Nm at a belt load of 500 N. Table 1 shows the maximum stress experienced by each of the hubs in trials one and two.

TABLE 1

| Spoke Design | Rectangular Tapered Beam Maximum Stress | I-Beam Maximum Stress | Inventive Embodiment Maximum Stress |
|---|---|---|---|
| Torsional Moment of 300 Nm | 79 MPa | 82 MPa | 80 MPa |
| Bending Moment of 100 Nm | 141 MPa | 171 MPa | 88 MPa |

As seen by the results in Table 1, all three hubs experienced substantially similar maximum stress for the torsional moment, but the inventive embodiment has a superior structural strength in bending. The lower maximum stress for the bending moment is an improvement of 38% over the hub having rectangular tapered beam spokes and 49% over the hub having the I-beam spokes. This was accomplished while still maintaining the same volume and weight as seen in the traditional prior art hubs tested in trials one and two.

Better performance of the spoke in response to bending forces and bending vibration modes enables the hub to be designed to withstand both bending and torsional forces. As shown by the previous example, a hub having the spoke design disclosed herein performs better at withstanding bending forces than traditional hubs having the same volume and weight. This may improve the fatigue life of the hub having the spoke design disclosed herein, which may also improve the fatigue life of the damper and increase the service life of both the hub and the damper.

If a hub having the spoke design disclosed herein is designed to provide the same performance as the prior art hubs rather than improved performance, then the hub having the spoke design disclosed herein may be made with less material than the prior art hubs for achieving the same performance. Designing the hub having the spokes disclosed herein with less material to achieve the same performance as the prior art may reduce the material costs, weight, and inertia of the TVD. The spoke design disclosed herein also allows the hub to be cost-effectively made by known processes such as casting, for example.

Although the invention is shown and described with respect to certain embodiments, it is obvious that modifications will occur to those skilled in the art upon reading and understanding the specification, and the present invention includes all such modifications.

What is claimed is:
1. A torsional vibration damper comprising:
a hub; and an inertia member concentric about the hub with an elastomeric member operatively positioned therebetween;

wherein the hub comprises a plurality of spokes extending from an outer radial surface of a central member to an inner radial surface of a peripheral rim, each of the plurality of spokes comprising:
- a first end coupled to the outer radial surface of the central member;
- a second end coupled to the inner radial surface of the peripheral rim;
- a first concave surface extending between the first end and the second end and facing an axial direction;
- a second concave surface extending between the first end and the second end and facing opposite the first concave surface;
- a third concave surface extending between the first end and the second end and between the first concave surface and the second concave surface; and
- a fourth concave surface extending between the first end and the second end and between the first concave surface and the second concave surface, wherein the fourth concave surface faces generally opposite the third concave surface.

2. The torsional vibration damper of claim 1, wherein, for each of the plurality of spokes, the first concave surface and the second concave surface are concave extending from the first end to the second end.

3. The torsional vibration damper of claim 2, wherein, for each of the plurality of spokes, the first concave surface and the second concave surface are additionally concave extending from the third concave surface to the fourth concave surface.

4. The torsional vibration damper of claim 2, wherein, for each of the plurality of spokes, at least one concavity of at least one of the first concave surface, second concave surface, third concave surface, and fourth concave surface is defined by an arc of a circle.

5. The torsional vibration damper of claim 1, wherein, for each of the plurality of spokes, the third concave surface and the fourth concave surface are concave extending from the first end to the second end.

6. The torsional vibration damper of claim 5, wherein, for each of the plurality of spokes, the third concave surface and the fourth concave surface are generally flat extending from the first concave surface to the second concave surface.

7. The torsional vibration damper of claim 1, wherein the third concave surface faces generally perpendicular to the axial direction.

8. The torsional vibration damper of claim 1, wherein, for each of the plurality of spokes, a width of the second end is smaller than the first end.

9. The torsional vibration damper of claim 1, wherein, for each of the plurality of spokes, the first end has a shape that conforms to the outer radial surface of the central member, and the second end has a shape that conforms to the inner radial surface of the peripheral rim.

10. A front end accessory drive system comprising the torsional vibration damper of claim 1 mounted to a crankshaft for rotation therewith.

* * * * *